Patented Sept. 13, 1932

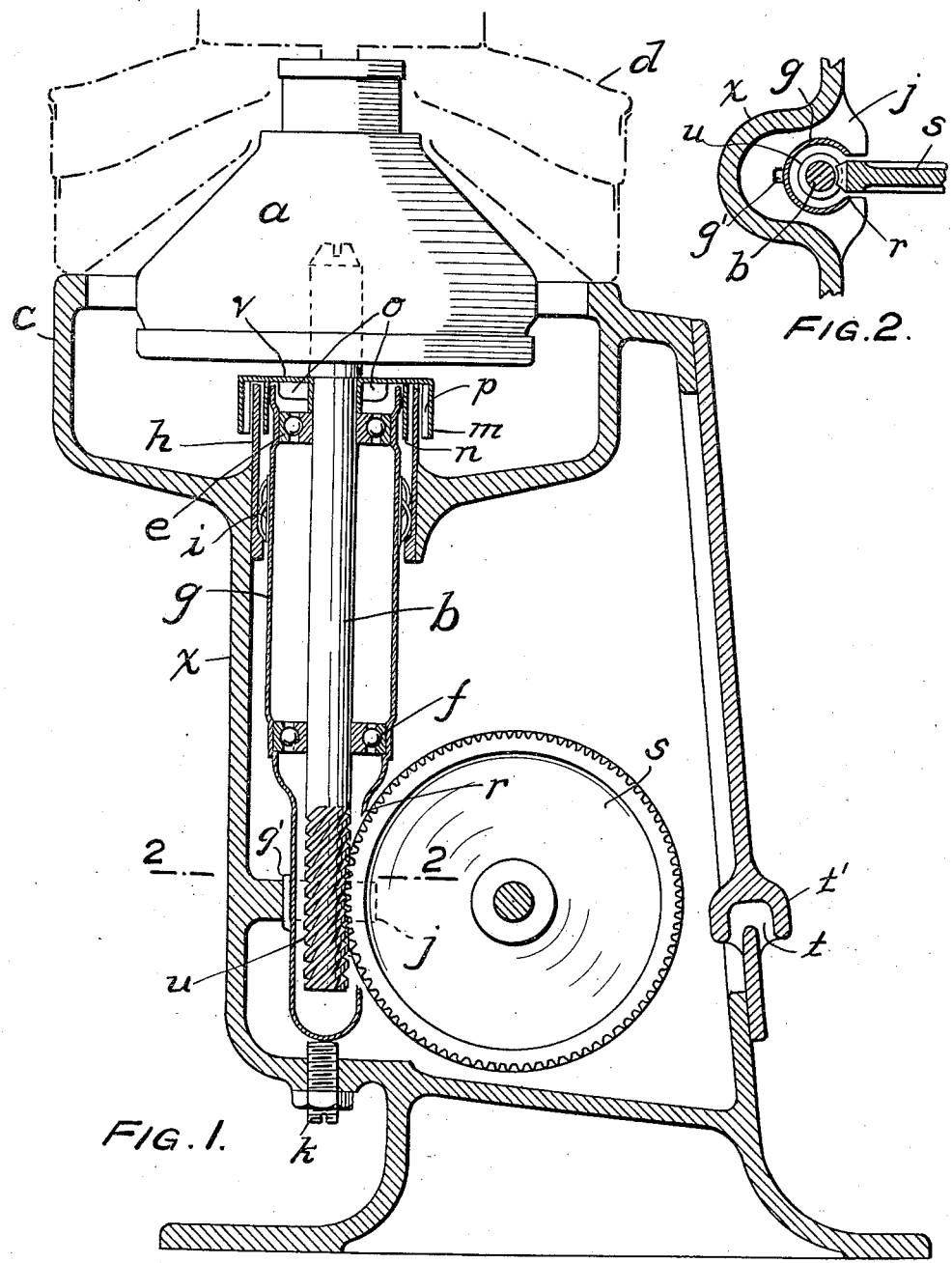

1,876,656

UNITED STATES PATENT OFFICE

ERIK AUGUST FORSBERG, OF STOCKHOLM, SWEDEN, ASSIGNOR TO THE DE LAVAL SEPARATOR COMPANY, OF NEW YORK, N. Y., A CORPORATION OF NEW JERSEY

MEANS FOR PROTECTIVELY SUPPORTING RAPIDLY ROTATED SHAFTS

Application filed December 19, 1927, Serial No. 241,043, and in Sweden January 3, 1927.

In rapidly rotating machines, particularly centrifugal separators, the use of anti-friction bearings has been attempted, but certain difficulties have been encountered. By anti-friction bearings I mean to include ball bearings, roller bearings and combinations of roller and ball bearings, such as those in which roller bearings take up the side pressure and ball bearings take up the end thrust.
It is necessary, primarily, to protect the anti-friction bearings against entering impurities, such as dust, water, moisture, milk and other foreign substances. It is also necessary to insure that the bearings shall have that degree of elasticity which is necessary for rapidly rotating bodies.

It has been possible, heretofore, to fulfill one of these conditions, but to fulfill both it has been necessary to resort to relatively complicated devices which, so far as concerns small centrifuges, are not practicable.

By means of my invention, a satisfactory arrangement of anti-friction bearings is secured or permitted, and at the same time such bearings are fully protected from impurities and offer the same degree of elasticity as is usual in bearing devices, while the device is simple, inexpensive and easy to manufacture.

In the drawing, which shows one preferred embodiment of my invention:

Fig. 1 is a vertical sectional view of a centrifugal separator embodying my invention.

Fig. 2 is a section on the line 2—2 of Fig. 1.

The separator bowl $a$ is supported in the usual way by the upper part of the spindle $b$. The machine frame $x$ comprises a bowl casing $c$ surrounding the lower part of the separator bowl and supporting the stationary receiving pans $d$. Spindle $b$ is supported by two anti-friction bearings which may be of any suitable construction, such as the ball bearings shown. The bearings are encased within a casing $g$.

In general it suffices that one of the bearings shall help in taking up the axial force, in which case the outer ring of the said bearing is in a suitable way fixed within or supported by the casing $g$.

As an example, Fig. 1 shows the lower bearing $f$ adapted to take up the vertical force, its outer ring in this case resting against a shoulder in the casing. The upper bearing may be assumed to be guided in the casing in a well known manner but to be free to move axially. The inner rings of both bearings may be assumed to be fixed to the spindle $b$. It can, of course also be assumed that the outer rings of both bearings are fixed in the casing and the inner ring of one bearing fixed to the spindle.

The bowl casing $c$ is provided, beneath the bowl, with a central opening through which the upper part of spindle $b$ and spindle casing $g$ extend. Projecting up from this opening is a tubular collar $h$, which, preferably, is prepared as a separate tubular member and is forced into, and thereby fixedly secured within, this opening. Between casing $g$ and the wall of the opening in the bowl casing is a suitable flexible and elastic support, such as a spring $i$, whereby casing $g$ is supported, with che desired elasticity, at its upper end portion. The lower end portion of casing $g$ is supported by a bracket $j$, which preferably comprises a flange integral with the housing or frame $x$ of which the bowl casing $c$ forms the upper part. Bracket $j$ nearly surrounds casing $g$ with but little play. The casing should be provided with a projection or key, such as $g'$, which engages a groove in bracket $j$ and insures the insertion of the casing in the correct positions and also prevents the same from partaking of the rotation of the bowl. The bottom of casing $g$ rests on a suitable support, preferably a screw $k$, which is adjustable vertically to adjust the bowl and spindle to their correct vertical position.

Secured to spindle $b$ above casing $g$ and collar $h$ is a cover $v$, which is provided with a depending mantle or skirt $m$ extending outside and spaced from collar $h$ and which may also be provided with a depending mantle or skirt $n$ extending down between and spaced from collar $h$ and casing $g$. Cover $v$ may be provided with suitable means for imparting a rotary movement to the air. Such means may be wings of any effective form as, for example, wings $o$ depending from the cover near spindle *b* and wings *p* extending inward from skirt *m*.

Casing *g* is provided with an opening at *r* to allow the driving force to be applied to the spindle, such as by a worm wheel *s* engaging a worm *u* on spindle *b*. Bracket *j* is provided with a corresponding recess, as shown in Fig. 2, for the same purpose.

The housing or frame *x* is intended to be partly filled with oil, in any usual way, so that the lubrication of the different parts may be secured. Any suitable means may be provided for locally lubricating the anti-friction bearings.

The housing frame is provided with an air hole *t* located above the normal oil level and through which there is free communication between the atmosphere and the interior of the housing. The housing should be provided with projecting lips *t'* that will prevent liquid, such as washing water, from entering the housing and oil from escaping therefrom.

The vibrations which usually occur in centrifugal bowls cause vibratory movements of the spindle and the surrounding casing *g*, which vibrations are taken up, in the usual way, by the spring device *i* and are thus prevented, except in negligible degree, from being transmitted to the housing frame. Casing *g* maintains bearings *e* and *f* axially centered so that no eccentric load can arise in the bearings. In this way a proper operation of the anti-friction bearings is secured at relatively high speeds and loads. It is desirable, but not necessary, to position bracket *j* opposite the point of engagement between the worm wheel and spindle worm. Thereby the relative movements between the two engaging machine parts caused by the vibrations will be reduced to a minimum and a steady and even transmission of force is secured under all conditions.

The protecting cover, with the devices secured thereto, imparts to the air a certain rotary movement, producing a fan action that causes air to be drawn from the housing frame into and along casing *g* over collar *h*, whence the air is dispersed in the bowl housing and escapes through receiving pans *d*. By reason of the provision of an opening from the atmosphere into the housing frame, an actual air current, as distinguished from a mere pressure difference, is established. By suitably dimensioning the different machine parts, the air current, when the machine is running, may be given any desired intensity; and air from the bowl casing cannot enter the interior of the spindle casing. Thus the driving mechanism, especially the anti-friction bearings, is protected from the entrance of liquid or moisture.

The upwardly moving air current also acts to carry with it finely divided oil particles which are produced in the rotation of the worm wheel. These particles rise within casing *g* and effect a continuous lubrication of the two anti-friction bearings.

The bowl casing should have the usual provision for the discharge of waste milk. If the collar *h* and the associated protecting devices are suitably dimensioned, the driving mechanism, when the machine is at rest as well as in operation, is insured against penetration of liquid.

It will thus be understood that by means of my invention there are secured, protection of the working parts, elastic operation of the bowl, good lubrication, and good transmission of the driving power to the bowl spindle.

While the described arrangement of cover plate, skirts and wings is of special utility, it will be understood that my invention, in its broader aspect, includes the combination, with other features of my invention, of known means for preventing the entrance of foreign matter into the bearings, as, for example, the arrangement set forth in the Wright Patent No. 1,386,148, dated August 2, 1921.

Having now fully described my invention, what I claim and desire to protect by Letters Patent is:

1. The combination of a centrifugal separator bowl and a driving shaft therefor, a frame comprising a casing surrounding the space adjacent the shaft-engaging end of the bowl and provided with an opening through which said shaft extends, a casing surrounding the shaft and extending through and spaced from the wall of said opening, spaced-apart anti-friction bearings between the shaft and the casing, an elastic support for the shaft casing, means to induce a flow of air upwardly along the shaft casing into the bowl casing, and a protective cover adapted to exclude the entrance of foreign matter from the bowl casing to the shaft casing and anti-friction bearings but allowing the specified flow of air.

2. The combination of a driving shaft, a casing surrounding the shaft, spaced-apart anti-friction bearings supported between the shaft and casing, means, including an elastic device, to support the casing, an annular member surrounding one end of the casing, a protective cover carried by the shaft and extending across said end of the casing and comprising a skirt extending along and spaced from said annular member, and means inducing a flow of air along said casing against said cover and around said annular member and skirt.

3. The combination of a driving shaft, a casing surrounding the shaft, spaced-apart anti-friction bearings supported between the shaft and casing, means, including an elastic device, to support the casing, an annular member surrounding one end of the casing, a protective cover carried by the shaft and extending across said end of the casing and comprising a skirt extending along and spaced from said annular member, and means, including a fan device, inducing a flow of air against said cover and around said annular member and skirt.

4. The combination of a vertical supporting and driving shaft and a centrifugal separator bowl mounted thereon, a casing surrounding the shaft, a power transmission device engaging the shaft, spaced-apart anti-friction bearings supported between the shaft and casing, a frame comprising a bowl casing and an enclosure for the shaft casing and power transmission device, means, including an elastic device, supporting the shaft casing, said frame having an opening for admission of atmospheric air, a protective cover adapted to exclude the entrance of foreign matter from the bowl casing into the shaft casing, and a fan device adapted to promote flow of air upwardly through said frame along the shaft casing and around said cover into the bowl casing.

5. The combination of a vertical supporting and driving shaft and a centrifugal separator bowl mounted thereon, a casing surrounding the shaft, a power transmission device engaging the shaft, spaced-apart anti-friction bearings supported between the shaft and casing, a frame comprising a bowl casing and an enclosure for the shaft casing and power transmission device, means, including an elastic device, supporting the shaft casing, said frame having an opening for admission of atmospheric air, an annular member on the frame and surrounding the upper end of the shaft casing, a protective cover carried by the shaft and extending across and spaced from the end of the shaft casing adjacent the bowl and extending along and spaced from said annular member, and a fan device adapted to promote flow of air upwardly through said frame along the shaft casing and around said cover and annular member into the bowl casing.

6. The combination of a centrifugal separator bowl and a driving shaft therefor, a frame comprising a casing surrounding the space adjacent the shaft-engaging end of the bowl and provided with an opening through which said shaft extends, a casing surrounding the shaft and extending through and spaced from the wall of said opening, a bearing for the shaft between the shaft and shaft casing, means to induce a flow of air upwardly along the shaft casing into the bowl casing, and a protective cover adapted to exclude the entrance of foreign matter from the frame casing to the shaft casing and bearing but allowing the specified flow of air.

7. The combination of a centrifugal separator bowl and a driving shaft therefor, a frame comprising a casing surrounding the space adjacent the shaft-engaging end of the bowl and provided with an opening through which said shaft extends, a casing surrounding the shaft and extending through and spaced from the wall of said opening, a bearing for the shaft between the shaft and shaft casing, a protective cover carried by the shaft and adjacent both the shaft casing and the opening in the frame casing and adapted to exclude the entrance of foreign matter from the frame casing to the shaft casing and bearing, and wings carried by said cover and acting as fans to induce a flow of air upwardly along the shaft casing into the frame casing.

8. The combination of a vertical supporting and driving shaft, a centrifugal bowl mounted thereon, a casing surrounding the shaft, a bearing for the shaft between the shaft and the casing, a frame comprising a bowl casing and an enclosure for the shaft casing, an annular member on the frame surrounding and spaced from the shaft casing, and a protective cover carried by the shaft and extending across the upper end of the casing and down along said annular member and permitting flow of air upwardly through said frame along the shaft casing but preventing entrance of foreign matter from the bowl casing into the shaft and shaft bearing.

In testimony of which invention, I have hereunto set my hand, at Stockholm, Sweden, on this 30th day of November, 1927.

ERIK AUGUST FORSBERG.